No. 718,639. PATENTED JAN. 20, 1903.
O. LASCHE.
VEHICLE WITH ELECTROMOTIVE POWER.
APPLICATION FILED JUNE 3, 1901.
NO MODEL. 3 SHEETS—SHEET 1.
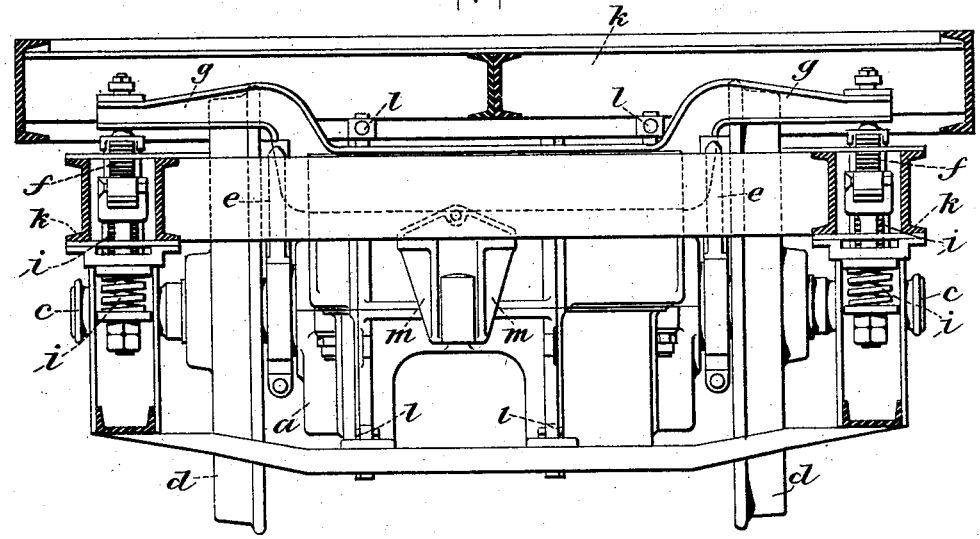
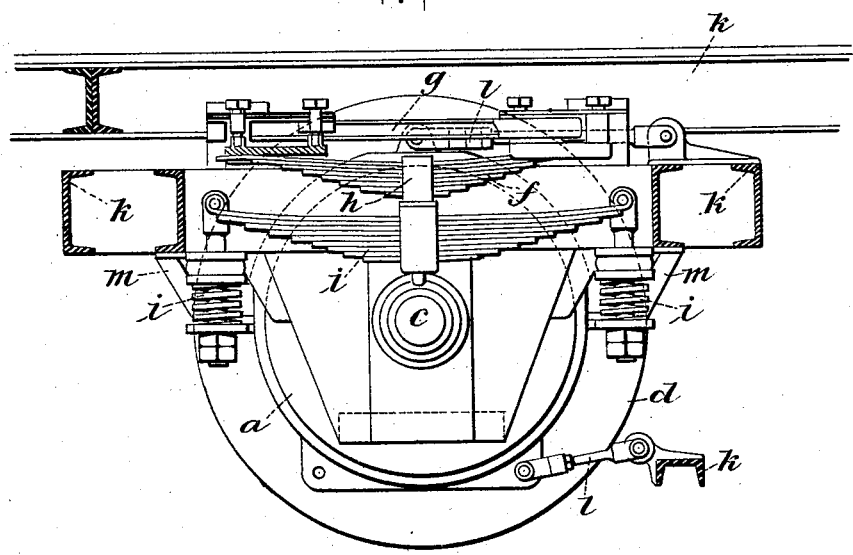
WITNESSES:
INVENTOR
Oskar Lasche
BY
ATTORNEYS No. 718,639. PATENTED JAN. 20, 1903.
O. LASCHE.
VEHICLE WITH ELECTROMOTIVE POWER.
APPLICATION FILED JUNE 3, 1901.

NO MODEL. 3 SHEETS—SHEET 3.

Witnesses
R. Aberli
John Lotka

Inventor
Oskar Lasche
By Briesen —
his Attorneys.

UNITED STATES PATENT OFFICE.

OSKAR LASCHE, OF CHARLOTTENBURG, GERMANY.

VEHICLE WITH ELECTROMOTIVE POWER.

SPECIFICATION forming part of Letters Patent No. 718,639, dated January 20, 1903.

Application filed June 3, 1901. Serial No. 62,932. (No model.)

*To all whom it may concern:*

Be it known that I, OSKAR LASCHE, engineer, a subject of the German Emperor, residing at Charlottenburg, Kingdom of Prussia, German Empire, have invented certain new and useful Improvements in Vehicles with Electromotive Power, of which the following is a specification.

My invention relates to electric vehicles, and particularly such as are intended for developing a high rate of speed, and has for its object to provide a construction in which the vibratory movement of the motor relatively to the body or frame will be comparatively small and in which the transmission of power from the motor to the wheels will be effected without any excessive strains on the gearing and shaft-couplings. For this purpose I employ a particular connection of the frame or truck with the motor-casing and provide guiding means for the motor, which prevent it from shifting or jerking laterally, and, further, I provide a novel arrangement of springs and a safety-sleeve for supporting the motor in case of a break of a suspension-spring.

The invention will be fully described hereinafter and its features of novelty pointed out in the appended claims.

Figure 3:
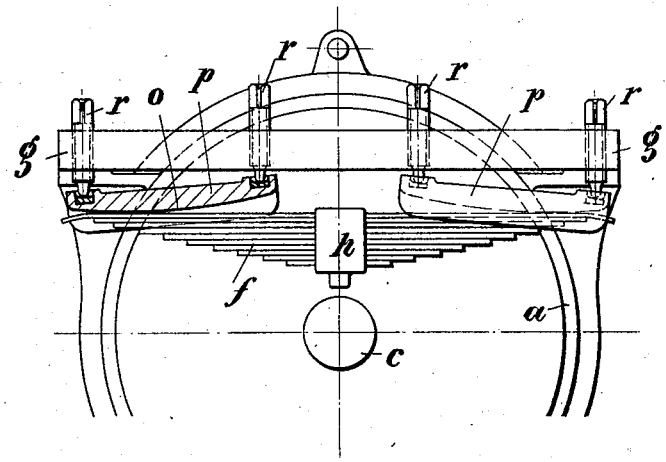
Figure 4:
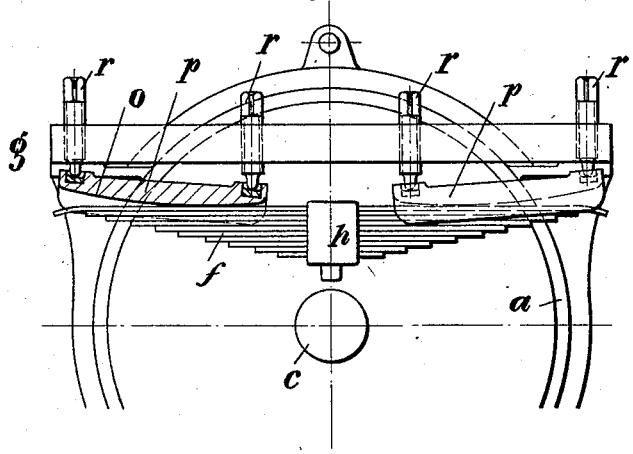
Figure 5:
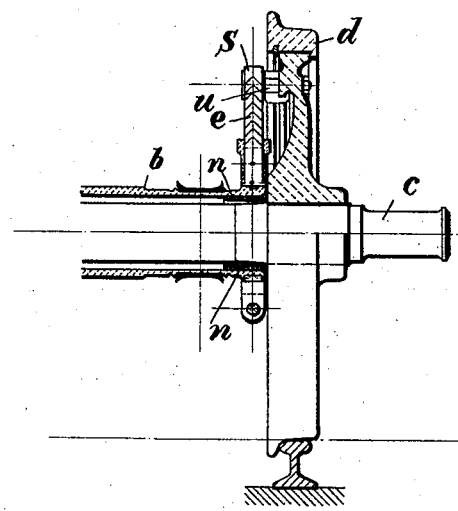
Figure 6:
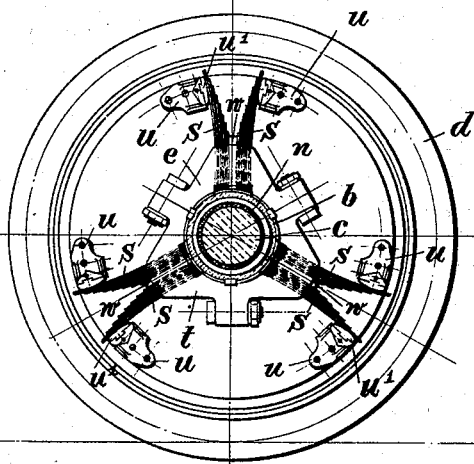

The accompanying drawings represent the said improvements, as follows:

Figure 1 is a front view and partly-sectional view of the motor suspension. Fig. 2 is a side view of it. Figs. 3 and 4 are indicating two different positions of the plate-spring arrangement. Figs. 5 and 6 are front and side views of the elastic coupling between the hollow motor-axle and the working wheel.

The motor $a$ is arranged upon a hollow shaft $b$, through which the working-wheel axle $c$ passes with play. The hollow motor-axle $b$ and the working-wheel axle $c$ or the working wheels $d$ are connected by a coupling. The motor $a$ is arranged on a frame $g$, resting on springs $f$, and the clip or tie-band $h$ of these springs $f$ rests direct on the box of the working-wheel axle $c$. The movements of the carriage-body are received by special springs $i$. The motor $a$ is to be guided vertically relatively to the carriage-underframe $k$. This is obtained by the motor-casing $a$ being connected with the underframe $k$ by connecting-rods $l$, arranged horizontally and adjustable in their longitudinal direction, which take up the torque of the motor-casing or of the armature. In order to secure the vertical guidance of the motors against lateral movement, tracks $m$ are provided on the underframe $k$ at the same level as the center of gravity of the motor, on which tracks the suitably-formed pole-casing of the motor is guided. This construction takes up any shocks which may occur vertically and laterally to the direction of driving.

In order to prevent the motor $a$ from knocking on the working axle $c$ in case of a suspension-spring breaking and causing this axle to break, a temporary suspension has been provided. This consists in a ring $n$, of comparatively soft material, being inserted at each end of the hollow motor-axle $b$, through which the locomotive working axle passes with play, Fig. 5. The bore of the ring $n$ is so dimensioned that the working axle $c$ can freely move, according to its maximum play, relatively to the hollow motor-axle $b$ without beating against the bolster-ring $n$. The plate-springs $f$, used for the elastic support of the motor $a$, engage with their free ends the curved sliding tracks $o$, Figs. 3 and 4, which has the effect that with little shocks, as well as with great shocks, the vibrations are always kept within certain limits. Besides, the curved sliding tracks $o$ can be fixed in special sliding shoes $p$, which can be adjusted on the suspension-frame $g$ by means of the screws $r$. The adjustable sliding shoes $p$ have the effect that the point of application of the dead load can be at once altered as may be required, so that one is entirely at liberty to adjust the elasticity as desired with the same load and with the same springs or to reregulate a spring which may have become slack. The coupling $e$, which becomes necessary with such motor arrangements, consists of an even number of plate-springs in radial position, (see Figs. 5 and 6,) of which the one half is for the forward and the other for the backward motion of the locomotive. These springs $s$ are supported in a ring $t$, consisting of several parts and arranged on the hollow motor-axle $b$, which ring is kept together by means of screws. The tappets $u$ of the working wheels $d$ engage the plate-springs $s$, for which purpose the working surfaces of the tappets may be provided with exchangeable parts $u'$. In each segment of the ring $t$ two spring-bundles $s$ are provided with their backs against each other, Fig. 6. Besides, every spring-plate engages with laterally-projecting parts $v$ over the inner ring-surface of the coupling-rings, Fig. 5, and between each two spring-bundles $s$ of a set a wedge $w$ is provided, which in consequence of its centrifugal power tends to still more press the individual spring-plates against each other.

Having described my invention, what I claim, and desire to secure by Letters Patent, is—

1. The combination of a wheeled axle, a body, springs supporting the body on the axle, a motor-frame, and springs carrying said motor-frame and located in the same vertical planes with the body-springs.

2. The combination of a wheeled axle, a body, springs supporting the body on the said axle, independent springs resting on the body-springs, and a motor-frame supported by said independent springs.

3. The combination of a wheeled axle, supporting-springs resting thereon, and a motor-frame having longitudinally-curved shoes engaging the said springs.

4. The combination of a wheeled axle, springs resting thereon, a motor-frame, longitudinally-extending shoes carried by said frame and engaging the springs, and adjusting devices connected with the ends of said shoes to give the said shoes a horizontal or more or less inclined position.

5. The combination of a wheeled axle, a body thereon, a spring-supported motor-frame, and longitudinal rods, each of which has one of its ends pivotally connected with the motor-frame, while its other end is pivoted to the body, but held against sliding lengthwise in relation thereto, so that the two pivotal connections of each rod will remain at a constant distance from each other when the frame moves relatively to the body.

6. The combination of a wheeled axle, a spring-supported motor-frame substantially concentric with the axle, a motor-shaft within said frame, driving-springs extending outwardly from said motor-shaft, and abutments or engaging parts connected with the wheeled axle and having a sliding engagement with the said springs so that as the position of the motor-frame relatively to the axle varies the springs will slide inward or outward on the said engaging parts.

7. The combination of a wheeled axle, a motor-shaft, springs extending outward from said motor-shaft and arranged in pairs, the springs of each pair spreading outwardly, and engaging parts connected with the wheeled axle and in contact with the said springs.

8. The combination of a wheeled axle, a motor-shaft, driving-springs arranged in pairs and extending outwardly from said shaft, engaging parts connected with the wheeled axle and in contact with the springs, and wedges located between the springs of the same pair.

9. The combination of a wheeled axle, a spring-supported tubular motor-shaft surrounding the axle and in driving connection therewith, and a safety-cushion located between the axle and the shaft to prevent the latter from pounding against the axle in case of a breakage of the supporting-springs.

OSKAR LASCHE.

Witnesses:
WOLDEMAR HAUPT,
HENRY HASPER.